United States Patent
Pullagurla et al.

(10) Patent No.: US 10,981,939 B2
(45) Date of Patent: Apr. 20, 2021

(54) PROCESS FOR THE PREPARATION OF 4-[(1-HYDROXY-1,3-DIHYDRO-2,1-BENZ-OXABOROL-5-YL) OXY] BENZONITRILE (CRISABOROLE)

(71) Applicant: BIOPHORE INDIA PHARMACEUTICALS PVT. LTD., Hyderabad (IN)

(72) Inventors: Manik Reddy Pullagurla, Hyderabad (IN); Bhaskar Reddy Pitta, Hyderabad (IN); Suresh Babu Namana, Hyderabad (IN); Jagadeesh Babu Rangisetty, Hyderabad (IN)

(73) Assignee: BIOPHORE INDIA PHARMACEUTICALS PVT. LTD., Hyderabad (IN)

( * ) Notice: Subject to any disclaimer, the term of this patent is extended or adjusted under 35 U.S.C. 154(b) by 0 days.

(21) Appl. No.: 16/612,459

(22) PCT Filed: May 12, 2018

(86) PCT No.: PCT/IN2018/050297
§ 371 (c)(1),
(2) Date: Nov. 11, 2019

(87) PCT Pub. No.: WO2018/207216
PCT Pub. Date: Nov. 15, 2018

(65) Prior Publication Data
US 2020/0062785 A1  Feb. 27, 2020

(30) Foreign Application Priority Data

May 12, 2017 (IN) .............. 201741016807

(51) Int. Cl.
*C07F 5/02* (2006.01)
(52) U.S. Cl.
CPC .................. *C07F 5/025* (2013.01)

(58) Field of Classification Search
CPC ...................................... C07F 5/025
See application file for complete search history.

(56) References Cited

U.S. PATENT DOCUMENTS 7,582,621 B2   9/2009  Baker et al.

FOREIGN PATENT DOCUMENTS

| WO | 2007095638 A2 | 8/2007 |
| WO | 2009111676 A2 | 9/2009 |

OTHER PUBLICATIONS

Akama, T., et al. "Discovery and structure-activity study of a novel benzoxaborole anti-inflammatory agent (AN2728) for the potential topical treatment of psoriasis and atopic dermatitis." Bioorganic & Medicinal Chemistry Letters. (2009), vol. 19, pp. 2129-2132. (Year: 2009).*
International Search Report for PCT/IN2018/050297 dated Aug. 31, 2018.

* cited by examiner

*Primary Examiner* — John S Kenyon
(74) *Attorney, Agent, or Firm* — McCormick, Paulding & Huber PLLC

(57) ABSTRACT

The present invention relates to a novel process for the preparation of substantially pure Crisaborole (I).

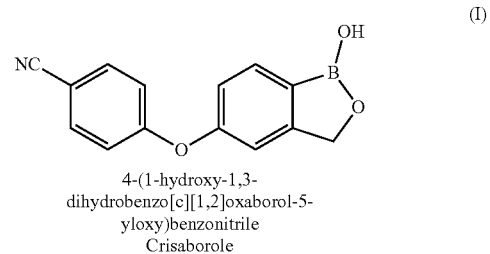

4-(1-hydroxy-1,3-dihydrobenzo[c][1,2]oxaborol-5-yloxy)benzonitrile
Crisaborole

7 Claims, No Drawings

PROCESS FOR THE PREPARATION OF 4-[(1-HYDROXY-1,3-DIHYDRO-2,1-BENZOX-ABOROL-5-YL) OXY] BENZONITRILE (CRISABOROLE)

CROSS-REFERENCE TO RELATED APPLICATIONS

This application is a National Stage application of International Patent Application No. PCT/IN2018/050297, filed on May 12, 2018, which claims priority to Indian Patent Application No. 201741016807 filed on May 12, 2017, each of which is hereby incorporated by reference in its entirety.

TECHNICAL FIELD

The invention relates to a novel process for the preparation of Crisaborole (I). More particularly, the invention relates to a novel process for the preparation of substantially pure Crisaborole (I).

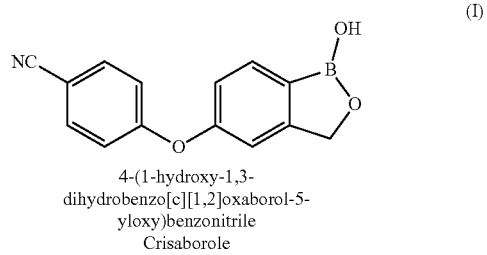 [SMILES: N#Cc1ccc(Oc2ccc3c(c2)COB3O)cc1]

4-(1-hydroxy-1,3-dihydrobenzo[c][1,2]oxaborol-5-yloxy)benzonitrile
Crisaborole

BACKGROUND

Crisaborole is chemically 4-[(1-hydroxy-1,3-dihydro-2,1-benzoxaborol-5-yl) oxy] benzonitrile with a trade name of Eucrisa. It is a novel, non-steroidal topical anti-inflammatory phosphodiesterase-4 (PDE-4) inhibitor used for the treatment of mild-to-moderate atopic dermatitis. It was approved by USFDA on Dec. 14, 2016 for treatment of eczema.

Literature survey revealed very few synthetic routes for the preparation of Crisaborole, the contents of which are hereby incorporated as reference in their entirety. However, these processes either suffered from lack of reproducibility or low yields unsuitable to meet industry needs.

U.S. Pat. No. 7,582,621 describes the synthesis of Crisaborole by reacting 2 bromo-4-(4-cyanophenoxy)-1-(methoxymethoxymethyl) benzene (compound 4) with n-butyllithium, trimethyl borate and purified by flash chromatography.

WO2009111676 describes the synthesis of intermediate 2-bromo-5-(4-cyanophenoxy) benzyl acetate and intermediate 5-(4-cyanophenoxy)-2-(4,4,5,5-tetramethyl-1,3,2-dioxaborolan-2-yl) benzyl acetate using sodium acetate, followed by Palladium(II) chloride and potassium acetate.

Bioorganic & Medicinal Chemistry Letters (2009), 19(8), 2129-2132 describes the complete process for the synthesis of Crisaborole by treating 4-(4-bromo-3-methyl phenoxy) benzonitrile with N-bromosuccinimide in carbon tetrachloride with refluxing and further treating the reaction mass with sodium acetate, sodium hydroxide and methanol to obtain 4-(4-bromo-3-(hydroxymethyl)phenoxy)benzonitrile intermediate, which reacted with 4-dihydro-2H-pyran, camphor sulfonic acid and Tri-isopropyl borate(i-PrO)$_3$B, n-butyllithium in tetrahydrofuran (THF) and treating with hydrochloric acid to obtain 4-(1-hydroxy-1,3-dihydrobenzo[c][1,2]oxaborol-5-yloxy)benzonitrile (22-57%).

The present inventors hereby report a novel process for the synthesis and purification of Crisaborole (I) with high yield and purity by using safe, environmental friendly and commercially viable reagents.

SUMMARY

Accordingly, it is an object of the present invention to provide a novel process for the preparation of 4-[(1-hydroxy-1,3-dihydro-2,1-benzoxaborol-5-yl) oxy] benzonitrile (Crisaborole I).

In one aspect of the invention, a method of preparing a substantially pure Crisaborole having purity greater than or equal to 99.5% is provided.

In another object of the invention, a method of preparing Crisaborole intermediates with purity greater than or equal to 95% purity is provided.

The current invention describes a novel method for synthesis of pharmaceutical grade Crisaborole which comprises of the following steps:

1. Reduction of 4-(4-bromo-3-formylphenoxy) benzonitrile (VI) dissolved a protic solvent in presence of a suitable reducing agent to form 4-(4-bromo-3-(hydroxymethyl) phenoxy) benzonitrile (V).

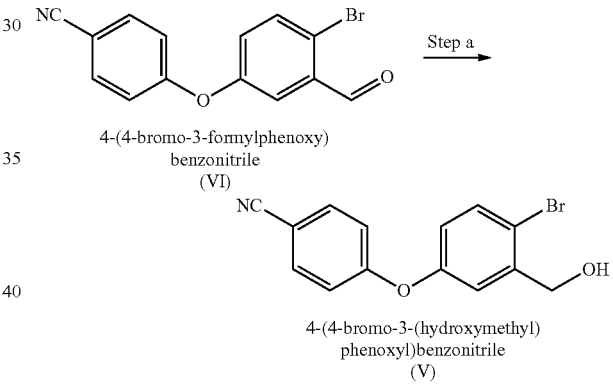

2. Protection of the primary hydroxyl group of 4-(4-bromo-3-(hydroxymethyl) phenoxy) benzonitrile (V) in the presence of a suitable protecting group under optimum reaction conditions to yield 2-bromo-5-(4-cyanophenoxy) benzyl acetate (IV).

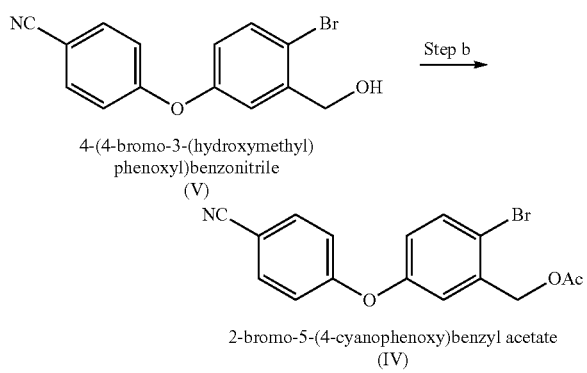

3. Catalytic borylating of 2-bromo-5-(4-cyanophenoxy) benzyl acetate (IV) to 5-(4-cyano phenoxy)-2-(4,4,5,5-tetramethyl-1,3,2-dioxaborolan-2-yl) benzyl acetate (III) in an aprotic solvent by using a suitable borylation reagent in the presence of a transition metal catalyst which helps in the cross-coupling reaction.

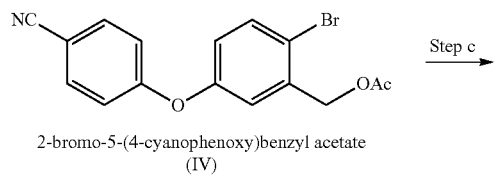

2-bromo-5-(4-cyanophenoxy)benzyl acetate
(IV)

Step c →

5-(4-cyanophenoxy)-2-(4,4,5,5-tetramethyl-1,3,2-dioxaborolan-2-yl)benzyl acetate
(III)

4. Deprotection of the hydroxyl group of intermediate (III) using a deprotecting agent to form 4-(3-(hydroxymethyl)-4-(4,4,5,5-tetramethyl-1,3,2-dioxaborolan-2yl) phenoxy) benzonitrile (II).

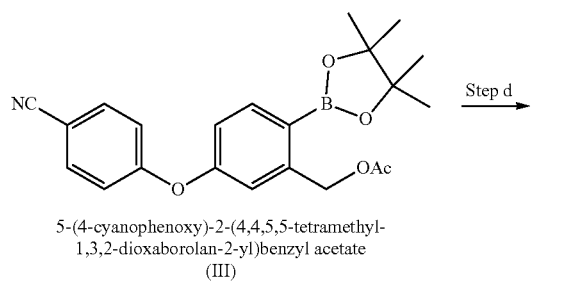

5-(4-cyanophenoxy)-2-(4,4,5,5-tetramethyl-1,3,2-dioxaborolan-2-yl)benzyl acetate
(III)

Step d →

4-(3-(hydroxymethyl)-4-(4,4,5,5-tetramethyl-1,3,2-dioxaborolan-2-yl)phenoxy)benzonitrile
(II)

5. Cyclizing 4-(3-(hydroxymethyl)-4-(4,4,5,5-tetramethyl-1,3,2-dioxaborolan-2yl) phenoxy) benzonitrile (II) to crude Crisaborole (I) by converting the dioxaborolane group to 1,2-oxaborolan-2-ol under suitable reaction conditions.

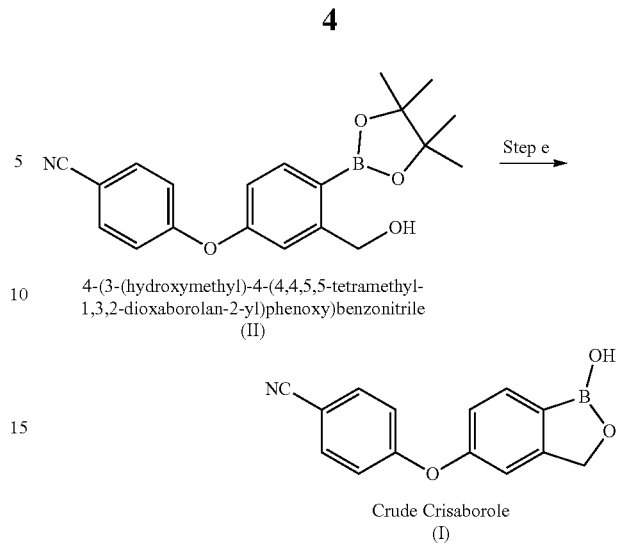

4-(3-(hydroxymethyl)-4-(4,4,5,5-tetramethyl-1,3,2-dioxaborolan-2-yl)phenoxy)benzonitrile
(II)

Step e →

Crude Crisaborole
(I)

6. Finally, purifying the crude Crisaborole (I) using different solvent mixtures and optionally heating the solution to dissolve the compound and isolating the pure compound by cooling the solution to obtain more than 99.5% pure Crisaborole (I).

The reducing agent employed in step a) is selected from the group comprising of sodium borohydride, lithium aluminium hydride, diisobutyl aluminium hydride and lithium triethyl borohydride. Preferably sodium borohydride is used in the present invention.

The hydroxyl protecting group employed in step b) is selected from the group comprising of acetals selected from methoxymethyl ether (MOM), 2-methoxymethyl ether (MEM), methylthiomethyl ether (MTM), benzyloxymethyl ether (BOM), p-methoxybenzylether (PMBM), 2-(triethylsilyl)ethoxymethyl ether, tetrahydropyranyl ether (THP); ethers selected from ally ether, trityl ether, benzyl ether, p-methoxybenzyl ether; silyl ethers selected from Trimethylsilyl (TMS), Triethylsilyl (TES), dimethylisopropylsilyl (IPDMS), diethylisopropylsilyl (DEIPS), t-butyldimethylsilyl (TBS); carbonates selected from methyl carbonate, trichloroethyl carbonate, allyl carbonate, 2-(trimethylsilyl) ethyl carbonate and esters selected from acetate, chloroacetate, dichloroacetate, trichloroacetate, trifluoroacetate (TFA), pivaloate (Pv), benzoate (Bz), p-methoxybenzoate, p-bromobenzoate. Preferably, the hydroxyl group is protected as esters using acetic anhydride in the present invention.

The process step b) is carried out in presence of base comprising an organic base selected from the group consisting of pyridine, 4-Dimethylaminopyridine (DMAP), triethyl amine, lutidine, 1,4-diazabicyclo [2.2.2] octane (DABCO); 1,8-diazabicyclo [5.4.0] undec-7-ene (DBU); 1,2,2,6,6-pentamethylpipiridine, 1,1,3,3-tetramethylguanidine, N, N diisopropyl ethylamine (iPr2Net); and N, N-dicyclohexylmethylamine (Cy2NMe) or the inorganic base selected from a group consisting of sodium hydroxide, potassium hydroxide sodium carbonate potassium carbonate, cesium hydroxide, sodium methoxide, sodium ethoxide; potassium methoxide, potassium ethoxide, lithium methoxide, sodium butoxide, potassium butoxide, sodium carbonate, potassium carbonate, cesium carbonate, potassium acetate, sodium acetate, ammonium acetate and copper (II) acetate. Preferably pyridine, triethylamine and sodium bicarbonate are used in the present invention.

The borylation agent employed in step c) is selected from the group comprising of bis(neopentylglycolato)diboron, bis(catecholato)diboron, bis(hexylene glycolato)diboron, bis(pinacolato)diboron, tetrahydroxydiboron, pinacolborane, methylpentanediolborane, catecholborane, neopentylglycoborane and trialkyl borate. Preferably bis(pinacolato)diborane is used in the present invention.

The transition metal catalyzed cross-coupling reaction of step c) is carried out in presence of Palladium catalyst selected from [1,1'Bis(diphenylphosphino) ferrocene]palladium (II) dichloride, [PdCl2(dppf)]; Dichloro[1,1'bis(diphenylphosphino) ferrocene]palladium(II)dichloromethane, [PdCl2dppf].CH2Cl2; Palladium (II) bis (triphenylphosphine)dichloride, [PdCl2(PPh3)2]; Tetrakis(triphenylphosphine)palladium(0), [P d(PPh3)4]; Palladium(II)acetate, [Pd (OAc)2]; Tris(dibenzylideneacetone)dipalladium(0) [Pd2d ba3]; Allylpalladium(II)chloride-dimer, [Pd(allyl)Cl]2; Palladium(II) acetylacetonate [Pd(acac)2] and PhPd(OAc) [(PPh)2]3.

In one aspect of the invention, Palladium catalyst used is [1,1'-bis(diphenylphosphino) ferrocene] dichloropalladium (II).

The deprotecting agent employed in step d) is selected from the group comprising acid or base, wherein the acid deprotecting agent is selected from the group comprising of hydrochloric acid, sulphuric acid, formic acid, acetic acid, boron trifluoride diethyl etherate and aluminium chloride and the base deprotecting agent is selected from the group comprising of sodium hydroxide, potassium hydroxide, and cesium hydroxide; metal alkoxides selected from the group comprising of sodium methoxide, sodium ethoxide; potassium methoxide, potassium ethoxide, lithium methoxide, sodium butoxide and potassium butoxide; metal carbonates selected from the group comprising of sodium carbonate, potassium carbonate and cesium carbonate; metal acetate selected from the group comprising of potassium acetate, sodium acetate, ammonium acetate and copper(II)acetate. Preferably sodium hydroxide is used in the present invention.

In another aspect, the invention provides a process for preparation of pure 4-[(1-hydroxy-1,3-dihydro-2,1-benzoxaborol-5-yl) oxy] benzonitrile (Crisaborole (I)) having a purity of greater than 99.5%, comprising the steps of:
1. providing a solution of Crisaborole (I) in a mixture of a suitable protic and aprotic solvent;
2. optionally heating the reaction mixture at 60-65° C.;
3. cooling the reaction mixture to 0-5° C.;
4. isolating pure Crisaborole (I).

The purification of crude Crisaborole is carried out by mixing crude Crisaborole (I) in suitable solvents or solvent mixtures, optionally heating the solution to dissolve the compound and isolating the pure compound by cooling the solution to obtain pure Crisaborole (I). Purification using mixture of protic or aprotic solvents aids in easy removal of unwanted impurities and enhances the yield of pure Crisaborole as compared to prior art processes which do not clearly mention the yield obtained.

In the above purification process, the protic solvent is selected from the group comprising of water, acetic acid, methanol, ethanol, isopropyl alcohol (IPA) and propylene glycol or mixtures thereof; and the aprotic solvent is selected from a group comprising of hexanes, toluene, cyclohexane; acetonitrile; tetrahydrofuran; acetone; ethyl acetate; dichloromethane, 1,4-dioxane and dimethyl sulfoxide, or mixtures thereof.

DETAILED DESCRIPTION

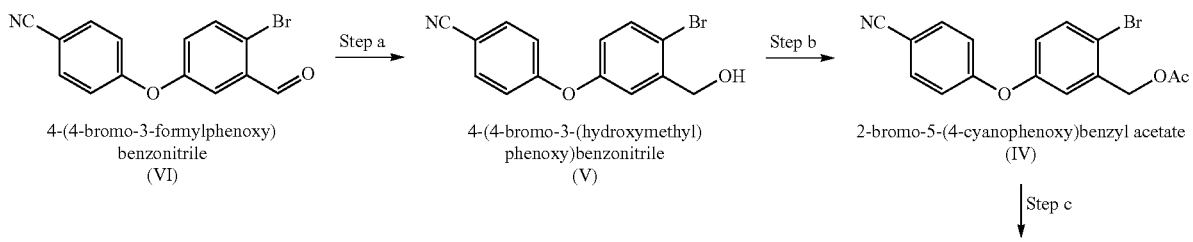

4-(4-bromo-3-formylphenoxy)
benzonitrile
(VI)

Step a →

4-(4-bromo-3-(hydroxymethyl)
phenoxy)benzonitrile
(V)

Step b →

2-bromo-5-(4-cyanophenoxy)benzyl acetate
(IV)

Step c ↓

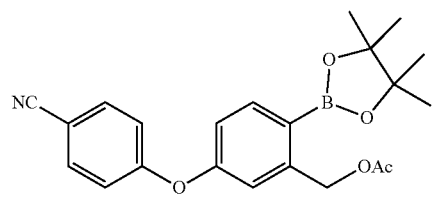

5-(4-cyanophenoxy)-2-(4,4,5,5-tetramethyl-
1,3,2-dioxaborolan-2-yl)benzyl acetate
(III)

Step d ↓

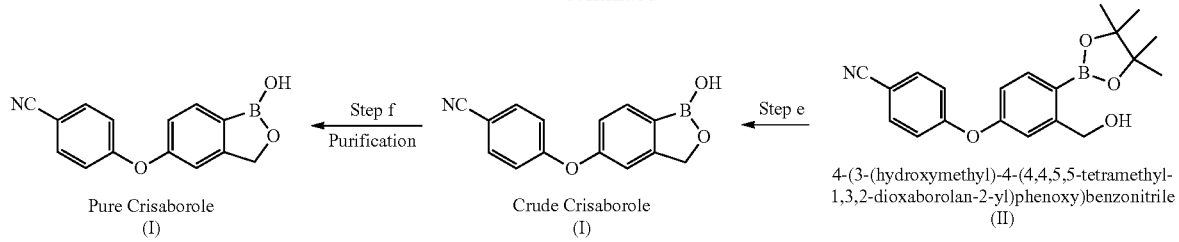

Pure Crisaborole (I)

Crude Crisaborole (I)

4-(3-(hydroxymethyl)-4-(4,4,5,5-tetramethyl-1,3,2-dioxaborolan-2-yl)phenoxy)benzonitrile (II)

The above scheme outlines the steps involved in the synthesis of (I).

Step a) proceeds with the reduction of 4-(4-bromo-3-formylphenoxy) benzonitrile (VI) in presence of reducing agent to form 4-(4-bromo-3-(hydroxymethyl) phenoxy) benzonitrile (V). 4-(4-bromo-3-formylphenoxy) benzonitrile (VI) is dissolved in a protic solvent and is reacted with a suitable reducing agent at 25-30° C. Optionally the reaction mass is cooled and treated with a suitable protic solvent. On completion of reaction, the solvent may be removed to yield 4-(4-bromo-3-(hydroxymethyl) phenoxy) benzonitrile (V).

The suitable reducing agent used in step a) is selected from the group comprising of sodium borohydride, lithium aluminum hydride, diisobutyl aluminium hydride, lithium triethyl borohydride or the like, preferably sodium borohydride is used in the present invention.

Step b) involves the protection of the primary hydroxyl group of 4-(4-bromo-3-(hydroxymethyl) phenoxy) benzonitrile (V) with a suitable protecting group in the presence of catalytic amount of suitable base under optimum reaction conditions to yield 2-bromo-5-(4-cyanophenoxy) benzyl acetate (IV).

The hydroxyl protecting groups used in the above step is selected from a group comprising of acetals including methoxymethyl ether (MOM), 2-methoxymethyl ether (MEM), methylthiomethyl ether (MTM), benzyloxymethyl ether (BOM), p-methoxybenzylether (PMBM), 2-(triethylsilyl)ethoxymethyl ether, tetrahydropyranyl ether (THP); ethers including ally ether, trityl ether, benzyl ether, p-methoxybenzyl ether; silyl ethers including Trimethylsilyl (TMS), Triethylsilyl (TES), dimethylisopropylsilyl (IPDMS), diethylisopropylsilyl (DEIPS), t-butyldimethylsilyl (TBS); carbonates including methyl carbonate, trichloroethyl carbonate, allyl carbonate, 2-(trimethylsilyl) ethyl carbonate and esters including acetate, chloroacetate, dichloroacetate, trichloroacetate, trifluroacetate (TFA), pivaloate (Pv), benzoate (Bz), p-methoxybenzoate, p-bromobenzoate or the like. Preferably, the hydroxyl group is protected as esters using acetic anhydride in the present invention.

The base employed in step b) is selected from organic or inorganic bases. The organic bases are selected from comprising of pyridine, 4-Dimethylaminopyridine (DMAP), triethyl amine, lutidine, 1,4-diazabicyclo [2.2.2] octane (DABCO); 1,8-diazabicyclo [5.4.0]undec-7-ene (DBU); 1,2,2,6,6-pentamethylpipiridine, 1,1,3,3-tetramethylguanidine, N, N diisopropylethylamine(iPr$_2$Net); N, N-dicyclohexylmethylamine (Cy$_2$NMe) or the like. The inorganic bases are selected from a group comprising of sodium hydroxide, potassium hydroxide, cesium hydroxide, sodium methoxide, sodium ethoxide; potassium methoxide, potassium ethoxide, lithium methoxide, sodium butoxide, potassium butoxide, sodium carbonate, potassium carbonate, cesium carbonate, potassium acetate, sodium acetate, ammonium acetate, copper (II) acetate or the like. Preferably pyridine, triethylamine and sodium bicarbonate are used in the present invention.

Step c) involves catalytic borylation of 2-bromo-5-(4-cyanophenoxy) benzyl acetate (IV) to 5-(4-cyanophenoxy)-2-(4,4,5,5-tetramethyl-1,3,2-dioxaborolan-2-yl) benzyl acetate (III) in a suitable aprotic solvent using a suitable borylation agent in the presence of a suitable transition metal catalyst which helps in the cross-coupling reaction.

The suitable borylation reagent employed in step c) is selected from the group comprising of bis(neopentylglycolato)diboron, bis(catecholato)diboron, bis(hexylene glycolato)diboron, bis(pinacolato)diboron, tetrahydroxydiboron, pinacolborane, methylpentanediolborane, catecholborane, neopentylglycoborane, trialkyl borate, preferably bis(pinacolato)diboron. Preferably bis(pinacolato)diborane is used in the present invention.

The transition metal catalyst used in the above step is selected from a group comprising of [1,1'Bis(diphenylphosphino) ferrocene] palladium (II) dichloride, [PdCl$_2$(dppf)]; Dichloro[1,1'bis(diphenylphosphino)ferrocene] palladium (II)dichloromethane, [PdCl$_2$dppf].CH$_2$Cl$_2$; Palladium (II) bis (triphenylphosphine) dichloride, [PdCl$_2$(PPh$_3$)$_2$]; Tetrakis(triphenylphosphine)palladium(0), [Pd(PPh$_3$)$_4$]; Palladium (II)acetate, [Pd(OAc)$_2$]; Tris(dibenzylideneacetone)dipalladium(0)[Pd$_2$dba$_3$]; Allylpalladium(II)chloride-dimer, [Pd (allyl)Cl]$_2$; Palladium(II) acetylacetonate [Pd(acac)$_2$], PhPd (OAc)[(PPh)$_2$]$_3$ or the like.

In one aspect of the invention, Palladium catalyst used is [1,1'-bis(diphenylphosphino) ferrocene] dichloropalladium (II).

Step d) relates to the deprotection of the primary hydroxyl group of intermediate (III) using a deprotecting agent to form 4-(3-(hydroxymethyl)-4-(4,4,5,5-tetramethyl-1,3,2-dioxaborolan-2yl) phenoxy) benzonitrile (II) under optimum reaction conditions.

Suitable hydroxyl deprotecting agents may be acid or base. The acid deprotecting agent are selected from the group comprising hydrochloric acid, sulphuric acid, formic acid, acetic acid, or the like. The bases as deprotecting agent are selected from the group comprising of sodium hydroxide, potassium hydroxide sodium carbonate potassium carbonate, cesium hydroxide or the like; metal alkoxides comprising of sodium methoxide, sodium ethoxide; potassium methoxide, potassium ethoxide, lithium methoxide, sodium butoxide, potassium butoxide or the like, metal carbonates comprising of sodium carbonate, potassium carbonate, cesium carbonate or the like; metal acetates comprising of potassium acetate, sodium acetate, ammonium acetate, copper (II) acetate or the like. Preferably sodium hydroxide is used in the present invention.

Step e) proceeds with cyclizing of 4-(3-(hydroxymethyl)-4-(4,4,5,5-tetramethyl-1,3,2-dioxaborolan-2yl) phenoxy) benzonitrile (II) to crude Crisaborole (I). Intermediate (II) is treated with a suitable acid under optimum conditions resulting in the formation of 4-(1-hydroxy-1,3-dihydrobenzo[c][1,2] oxaborol-5-yloxy) benzonitrile (I). The suitable acid used can be selected from a group comprising of hydrochloric acid, sulphuric acid, formic acid, acetic acid, or the like. Preferably hydrochloric acid is used in the present invention.

In one embodiment the suitable protic solvents used in step a), step b), step c), step d) and step e) are selected from a group comprising of water, methanol, ethanol, isopropyl alcohol, propylene glycol; butanol, isobutanol or the like; preferably water, methanol, isopropyl alcohol are used in the present invention. The aprotic solvents used in step a), step b), step c), step d) and step e) are selected from a group comprising of acetone, acetonitrile, 1,4-dioxane, diethyl ether, dichloromethane, ethyl acetate, N, N-dimethylformamide, methyl tertiary butyl ether, hexane, cyclohexane, toulene, tetrahydrofuran or the like; preferably dichloromethane, 1,4 dioxane, ethyl acetate and cyclohexane are used in the present invention.

Step f) involves the purification of crude Crisaborole (I) by mixing crude Crisaborole (I) in suitable solvents or solvent mixtures, optionally heating the solution to dissolve the compound and isolating the pure compound by cooling the solution to obtain pure Crisaborole (I).

Suitable solvents for purification of Crisaborole (I) are selected from the group comprising of protic and aprotic solvents or mixtures thereof. The aprotic solvents are selected from hexanes, toluene, cyclohexane; tetrahydrofuran; acetone; ethyl acetate; dichloromethane, 1,4-dioxane, acetonitrile, dimethyl sulfoxide or the like and protic solvents are selected from a group comprising of methanol, ethanol, isopropyl alcohol, propylene glycol; water; acetic acid or the like.

The following examples further illustrate the present invention but should not be construed in any way as to limit its scope.

EXAMPLES

Example-1: Preparation of 4-(4-bromo-3-(hydroxymethyl)phenoxy) benzonitrile(V)

50 g (0.16 mol) of 4-(4-bromo-3-formylphenoxy) benzonitrile (VI) was dissolved in methanol in a clean and dry round bottom flask, followed by treatment with equimolar quantity of sodium borohydride (6.2 g, 0.16 mol) with stirring at 25-30° C. until complete disappearance of starting material. After completion of the reaction, the reaction mass was concentrated, and the residue was mixed with water and dichloromethane. The organic layer was separated, and washed with saturated sodium chloride solution, dried over sodium sulphate and filtered. The filtrate was distilled under vacuum to obtain 4-(4-bromo-3-(hydroxymethyl) phenoxy) benzonitrile (V).
Yield %: 95.0; Purity %: 97.5

Example-2: Alternative Process for the Preparation of 4-(4-bromo-3-(hydroxymethyl)phenoxy) benzonitrile(V)

100 g of 4-(4-bromo-3-formylphenoxy) benzonitrile (VI) was dissolved in 500 mL of methanol at 25-30° C. and then cooled to 10-15° C. 6.2 g of sodium borohydride was added to the reaction mass at 10-15° C. for 60-90 min. The temperature of the reaction mass was raised to 15-20° C. After completion of the reaction, 1000 mL of water was added to the reaction mass, stirred for 1 hr at 25-30° C. The solid obtained was filtered under vacuum, washed with water and dried under vacuum below 55° C. to obtain 4-(4-bromo-3-(hydroxymethyl) phenoxy) benzonitrile (V).
Yield %: 99.0; Purity %: 99.02

Example-3: Preparation of 2-bromo-5-(4-cyanophenoxy) benzyl acetate(IV)

To a solution of 40 g (0.13 mole) of 4-(4-bromo-3-(hydroxymethyl) phenoxy) benzonitrile (V) and 20.21 g (0.198 mol) of acetic anhydride in dichloromethane, two drops of pyridine was added, and the mixture was stirred at room temperature. After completion of reaction, the reaction mixture was quenched with water and extracted with dichloromethane. The organic layer was separated, washed with saturated sodium bicarbonate solution 0.1N hydrochloric acid and water and dried over sodium sulphate. On filtration, the filtrate was evaporated to remove the solvent completely and yield 2-bromo-5-(4-cyanophenoxy) benzyl acetate (IV).
Yield %: 97.0; Purity %: 98.0

Example-4: Alternative Process for the Preparation of 2-bromo-5-(4-cyanophenoxy) Benzyl Acetate (IV)

100 g of 4-(4-bromo-3-(hydroxymethyl) phenoxy) benzonitrile (V) was added to 1000 ml of Dichloromethane with further addition of 66.3 g of triethylamine for 10-15 min at 25-30° C. 50.6 g of acetic anhydride was added to the reaction mass and stirred for 6 hrs. Further 6.6 g of triethylamine and 5.0 g of acetic anhydride was added and stirred for 6 hrs at 25-30° C. On completion of reaction, 500 ml of water was added to the reaction mass, stirred and kept undisturbed. The organic layer was separated and washed with 500 ml of 10% sodium bicarbonate solution portion wise. The organic layer was distilled under vacuum below 50° C., cooled and 200 ml of Isopropyl alcohol was added to the reaction mass at 25-30° C. The reaction mass was heated to 50° C., cooled and 400 mL of water added. The solid formed was filtered, washed with 50 mL of water and dried under vacuum below 55° C. to obtain-bromo-5-(4-cyanophenoxy) benzyl acetate (IV).
Yield %: 88.0; Purity %: 99.21

Example-5: Preparation of 5-(4-cyanophenoxy)-2-(4,4,5,5-tetramethyl-1,3,2-dioxaborolan-2-yl) benzyl acetate(III)

10 g (0.028 mol) of 2-bromo-5-(4-cyanophenoxy) benzyl acetate (IV) was dissolved in 100 mL 1,4-dioxane with addition of 8.8 g (0.034 mol) of bis(pinacolato)diboron and 8.5 g (0.086 mol) of potassium acetate. The resulting mixture was degassed using a stream of nitrogen and 424 mg (0.0057 mol) of [1,1'-bis(diphenylphosphino)ferrocene] dichloropalladium (II) as catalyst. The reaction mixture was heated at 80° C. for 4 hrs, followed by cooling to room temperature, diluting with water and extracting with ethyl acetate. The organic layer was dried over sodium sulphate and filtered. The filtrate was distilled under vacuum to yield 5-(4-cyanophenoxy)-2-(4,4,5,5-tetramethyl-1,3,2-dioxaborolan-2-yl) benzyl acetate (III). The obtained product was used in the next reaction step without further purification.
Yield %: 95.0; Purity %: 98.5

Example-6: Alternative Process for the Preparation of 5-(4-cyanophenoxy)-2-(4,4,5,5-tetramethyl-1,3,2-dioxaborolan-2-yl) Benzyl acetate(III)

100 g of 2-bromo-5-(4-cyanophenoxy) benzyl acetate (IV) was added to 600 mL of 1,4-dioxane at 25-30° C. under nitrogen atmosphere. 110 g of Bis(pinacolato)diborane and 85 g of potassium acetate were further added to the reaction mass and degassed. 4.0 g of [1,1'-bis(diphenylphosphino) ferrocene] dichloropalladium (II) was then added to the reaction mass at 25-30° C. and heated to 80-85° C. for 2-3 hrs to form crude 5-(4-cyanophenoxy)-2-(4,4,5,5-tetramethyl-1,3,2-dioxaborolan-2-yl) benzyl acetate(III). On completion of reaction, the reaction mass was cooled and 10 g of activated carbon added at 25-30° C. 600 ml ethyl acetate and 600 ml water were then added to the reaction mass, stirred and filtered through Hyflo. The organic layer was washed with 10% sodium chloride solution and dried over sodium sulphate. The filtrate was distilled off under vacuum and the solid was dissolved in 150 ml of methanol and cyclohexane at 25-30° C. The reaction mass was cooled for 1-2 hrs, filtered under vacuum, washed with chilled methanol and dried to obtain pure 5-(4-cyanophenoxy)-2-(4,4,5,5-tetramethyl-1,3,2-dioxaborolan-2-yl) benzyl acetate(III)

Yield %: 95.0; Purity %: 84.38

Example-7

Preparation of 4-(3-(hydroxymethyl)-4-(4,4,5,5-tetramethyl-1,3,2-dioxaborolan-2-yl) phenoxy) benzonitrile(II)

5 g (0.0127 mol) of the deprotected crude 5-(4-cyanophenoxy)-2-(4,4,5,5-tetramethyl-1,3,2-dioxaborolan-2-yl) benzyl acetate (III) was dissolved in methanol followed by addition of 0.76 g (0.019 mol) of sodium hydroxide and the mixture was stirred at room temperature until complete disappearance of the starting material. On completion of reaction, the reaction mixture was concentrated, and the residue was mixed with water and dichloromethane. The organic layer was separated, washed with brine solution (saturated sodium chloride solution), dried over sodium sulphate and filtered to remove the sodium sulphate. The filtrate was collected and completely evaporated to remove any traces of solvent to form 4-(3-(hydroxymethyl)-4-(4,4,5,5-tetramethyl-1,3,2-dioxaborolan-2-yl) phenoxy) benzonitrile(II).

Yield %: 95.0

Example-8: Preparation of Crude Crisaborole (I)

A mixture of 10 g of 4-(3-(hydroxymethyl)-4-(4,4,5,5-tetramethyl-1,3,2-dioxaborolan-2-yl) phenoxy) benzonitrile (II) and 100 mL of 4N hydrochloric acid, was stirred for 4 hrs at 80° C. Water was added to the mixture and extracted with ethyl acetate. The organic layer was separated and washed with water, dried over sodium sulphate and filtered. The filtrate was removed under vacuum to yield crude Crisaborole (I).

Yield %: 93.0; Purity %: 99.5

Example-9: Alternative One Pot Method for the Synthesis of Crude Crisaborole (I)

Intermediate (III) prepared as in example 6 was added to the basic sodium hydroxide solution, cooled to 15-20° C. and then heated at 40-45° C. for 2-3 hrs. On completion of reaction, the reaction mass was cooled to 25-30° C. and 5 volumes of dichloromethane was added to it. The pH was adjusted to 3.0-4.0 with 1.28 volumes of hydrochloric acid solution, stirred and filtered through Hyflo. The organic layer was separated and dried over sodium sulphate and filtered, the filtrate was distilled off under vacuum and the solid stripped off with acetone to obtain crude Crisaborole (I)

Yield %: 91.0; Purity %: 99.0

Example-10: Purification of Crude 4-(1-hydroxy-1,3-dihydrobenzo[c][1,2]oxaborol-5-yloxy) benzonitrile (I)

Purification of the crude Crisaborole was performed by following the below procedures.
1. Crude Crisaborole was treated with a mixture of isopropyl alcohol and ethyl acetate (1:4) at 60-65° C., cooled to 0-5° C. and maintained for 1 hr. The solid so obtained was vacuum filtered, washed with 0.5 volumes of chilled isopropyl alcohol and ethyl acetate solution mixture (1:4) and vacuum dried to obtain pure Crisaborole.
Yield %: 70.0; Purity %: 99.95
2. Crude Crisaborole was dissolved in a mixture of 7 volumes of toluene and isopropyl alcohol (6:1) at 55-60° C. to obtain a clear solution which was gradually cooled to 0-5° C., filtered and dried to obtain pure Crisaborole.
Yield %: 60.0; Purity %: 99.98
3. Crude Crisaborole was treated with a mixture of dioxane and water (2:8) at 50-60° C., then cooled to 0-5° C. and maintained for 4 hrs. The solid so obtained was filtered, washed with 1 volume of mixture of chilled 1,4-dioxane and water solution (1:5) and vacuum dried to obtain pure Crisaborole.
Yield %: 75.0; Purity %: 99.90
4. Crude Crisaborole was dissolved in 4 volumes of acetonitrile at 45-50° C. and 20 volumes of water was added dropwise, and the reaction mixture was gradually to 0-5° C. The solid so obtained was filtered, washed with 1 volume of chilled mixture of acetonitrile: water (1:10) and dried to obtain pure Crisaborole.
Yield %: 70.0;
Purity %: 99.95
5. Crude Crisaborole was dissolved in 2 volumes of dimethyl sulfoxide at 75 to 80° C. and 18 volumes of water was added dropwise. The reaction mass was gradually cooled to 0-5° C., filtered, washed with a 1 volume of chilled mixture of dimethyl sulfoxide: water (1:10) and dried to obtain pure Crisaborole.
Yield %: 75.0; Purity %: 99.90
6. Crude Crisaborole was dissolved in 5 volumes of isopropyl alcohol at 70-75° C. and 20 volumes of water was added dropwise and gradually cooled to 0-5° C., filtered, washed with mixture of 1 volume of chilled isopropyl alcohol: water (1:10) and dried to obtain pure Crisaborole.
Yield %: 68.0; Purity %: 99.96
7. Crude Crisaborole was treated with a mixture of methanol and water (2:8) at 50-60° C., then gradually cooled to 0-5° C., filtered and washed with 1 volume of mixture of chilled methanol and water (1:10) and dried to obtain pure Crisaborole.
Yield %: 80.0; Purity %: 99.95
8. Crude Crisaborole was treated with a mixture of propylene glycol and water (3:1) at 50-60° C. then gradually cooled to 0-5° C., filtered and washed with 1 volume of mixture of chilled propylene glycol and water (1:10), then dried to obtain pure Crisaborole.
Yield %: 80.0; Purity %: 99.90

9. Crude Crisaborole (I) was treated with 2 volumes of acetone and activated carbon was added and stirred for 10-15 mins at 25-30° C. The reaction mass was filtered through Hyflo. The filtrate was treated with 7 volumes of water and stirred for 1-2 hrs at 25-30° C. The solid formed was filtered under vacuum, washed with 0.5 volume of water and dried under vacuum. The dried solid was further treated with 0.4 volumes of methanol and heated to 60-65° C. for 60-90 min. The solid formed after cooling to 0-5° C., was filtered and washed with methanol. The wet cake was then mixed with 3 volumes of acetone and activated carbon was added at 25-30° C. The reaction mass was filtered, and the filtrate mixed with 7 volumes of water and stirred for 1 hr at 25-30° C. The solid so formed was filtered, washed with water and dried under vacuum below 50-55° C. to obtain pure Crisaborole (I).

Yield %: 52; Purity %: 99.97

We claim:
1. A process for the preparation of Crisaborole (I),

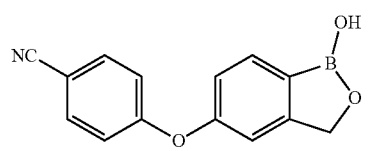

comprising the steps of:
a) reducing 4-(4-bromo-3-formylphenoxy) benzonitrile (VI)

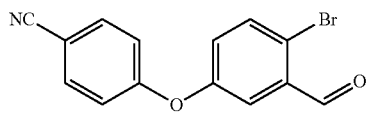

by treating with a reducing agent to form 4-(4-bromo-3-(hydroxymethyl) phenoxy) benzonitrile (V);

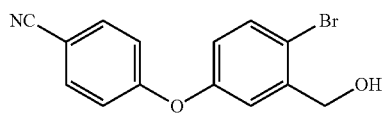

b) protecting primary hydroxyl group of 4-(4-bromo-3-(hydroxymethyl) phenoxy) benzonitrile (V) with a protecting group to obtain 2-bromo-5-(4-cyanophenoxy) benzyl acetate (IV);

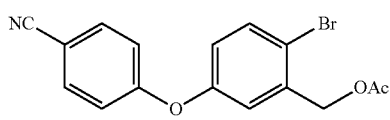

c) converting the hydroxyl protected 2-bromo-5-(4-cyanophenoxy) benzyl acetate (IV) into a borate compound 5-(4-cyano phenoxy)-2-(4,4,5,5-tetramethyl-1,3,2-dioxaborolan-2-yl) benzyl acetate (III) using a borylation reagent via a transition metal catalyzed cross-coupling reaction;

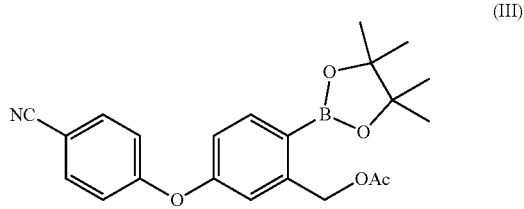 [SMILES: CC(=O)OCc1cc(Oc2ccc(C#N)cc2)ccc1B1OC(C)(C)C(C)(C)O1]

d) deprotecting the hydroxyl group of compound (III) to form 4-(3-(hydroxymethyl) -4-(4,4,5,5-tetramethyl-1,3,2-dioxaborolan-2yl) phenoxy) benzonitrile (II);

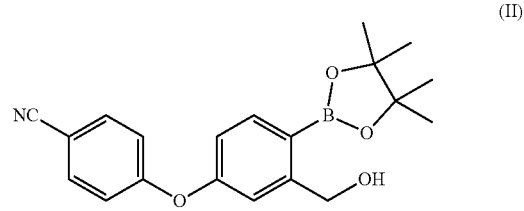 [SMILES: CC1(C)OB(c2ccc(Oc3ccc(C#N)cc3)cc2CO)OC1(C)C]

e) cyclizing 4-(3-(hydroxymethyl)-4-(4,4,5,5-tetramethyl-1,3,2-dioxaborolan-2yl) phenoxy) benzonitrile (II) to give Crisaborole (I) crude;
f) optionally, purifying crude Crisaborole (I) to obtain pure Crisaborole (I).

2. The process as claimed in claim 1, wherein the reducing agent employed in step a) is selected from the group consisting of sodium borohydride, lithium aluminium hydride, diisobutyl aluminium hydride and lithium triethyl borohydride.

3. The process as claimed in claim 1, wherein the hydroxyl protecting group employed in step b) is selected from the group consisting of acetals selected from methoxymethyl ether (MOM), 2-methoxymethyl ether (MEM), methylthiomethyl ether (MTM), benzyloxymethyl ether (BOM), p-methoxybenzyl ether (PMBM), 2-(triethylsilyl) ethoxymethyl ether, tetrahydropyranyl ether (THP); ethers selected from ally ether, trityl ether, benzyl ether, p-methoxybenzyl ether; silyl ethers selected from Trimethylsilyl (TMS), Triethylsilyl (TES), dimethylisopropylsilyl (IPDMS), diethylisopropylsilyl (DEIPS), t-butyldimethylsilyl (TBS); carbonates selected from methyl carbonate, trichloroethyl carbonate, allyl carbonate, 2-(trimethylsilyl)ethyl carbonate; and esters selected from acetate, chloroacetate, dichloroacetate, trichloroacetate, trifluroacetate (TFA), pivaloate (Pv), benzoate (Bz), p-methoxybenzoate, p-bromobenzoate.

4. The process as claimed in claim 1, wherein step b) is carried out in presence of base comprising an organic base selected from the group consisting of pyridine, 4-Dimethylaminopyridine (DMAP), triethyl amine, lutidine, 1,4-diazabicyclo[2.2.2]octane (DABCO), 1,8-diazabicyclo[5.4.0]undec-7-ene (DBU) 1,2,2,6,6-pentamethylpipiridine, 1,1,3,3-tetramethylguanidine, N,N-diisopropylethylamine (iPr₂NEt), and N,N-dicyclohexylmethylamine (Cy₂NMe) or the inorganic base selected from a group consisting of sodium hydroxide, potassium hydroxide, sodium carbonate, potassium carbonate, cesium hydroxide, sodium methoxide, sodium ethoxide, potassium methoxide, potassium ethoxide, lithium methoxide, sodium butoxide, potassium butoxide, sodium carbonate, potassium carbonate, cesium carbonate, potassium acetate, sodium acetate, ammonium acetate and copper(II)acetate.

5. The process as claimed in claim 1, wherein the borylation agent employed in step c) is selected from the group consisting of bis(neopentylglycolato)diboron, bis(catecholato)diboron, bis(hexyleneglycolato)diboron, bis(pinacolato)diboron, tetrahydroxydiboron, pinacolborane, methylpentanediolborane, catecholborane, neopentylglycoborane and trialkyl borate.

6. The process as claimed in claim 1, wherein transition metal catalyzed cross-coupling reaction of step c) is carried out in presence of Palladium catalyst selected from [1,1'Bis(diphenylphosphino)ferrocene]palladium(II)dichloride [$PdCl_2$(dppf)], Dichloro[1,1'bis(diphenylphosphino)ferrocene]palladium (II)dichloromethane [($PdCl_2$(dppf)).$CH_2Cl_2$, Palladium(II)bis(triphenylphosphine)dichloride [$PdCl_2(PPh_3)_2$], Tetrakis(triphenylphosphine)palladium(0)[Pd($PPh_3$)$_4$], Palladium(II)acetate [Pd(OAc)$_2$], Tris(dibenzylideneacetone)dipalladium(0) Pd$_2$dba$_3$], Allylpalladium(II)chloride-dimer [Pd(allyl)Cl]$_2$, Palladium(II)acetylacetonate [Pd(acac)$_2$] and PhPd(OAc) [(PPh)$_2$]$_3$.

7. The process as claimed in claim 1, wherein the deprotecting agent employed in step d) is selected from the group consisting of acid or base, wherein the acid deprotecting agent is selected from the group consisting of hydrochloric acid, sulphuric acid, formic acid, acetic acid, boron trifluoride diethyl etherate and aluminium chloride and the base deprotecting agent is selected from the group consisting of sodium hydroxide, potassium hydroxide, and cesium hydroxide; metal alkoxides selected from the group consisting of sodium methoxide, sodium ethoxide, potassium methoxide, potassium ethoxide, lithium methoxide, sodium butoxide and potassium butoxide; metal carbonates selected from the group consisting of sodium carbonate, potassium carbonate and cesium carbonate; metal acetate selected from the group consisting of potassium acetate, sodium acetate, ammonium acetate and copper(II)acetate.

* * * * *

UNITED STATES PATENT AND TRADEMARK OFFICE
CERTIFICATE OF CORRECTION

PATENT NO. : 10,981,939 B2  
APPLICATION NO. : 16/612459  
DATED : April 20, 2021  
INVENTOR(S) : Manik Reddy Pullagurla et al.

Page 1 of 1

It is certified that error appears in the above-identified patent and that said Letters Patent is hereby corrected as shown below:

In the Claims

Column 14, Claim 4, Line 62, after "(DBU)" please insert -- , --.

Column 16, Claim 6, Line 2, before "Pd2dba3]" please insert -- [ --.

Signed and Sealed this  
Fifth Day of October, 2021

Drew Hirshfeld  
*Performing the Functions and Duties of the*  
*Under Secretary of Commerce for Intellectual Property and*  
*Director of the United States Patent and Trademark Office*